United States Patent
Miyamae et al.

(10) Patent No.: US 11,074,000 B2
(45) Date of Patent: Jul. 27, 2021

(54) NON-TRANSITORY COMPUTER-READABLE STORAGE MEDIUM, AND INFORMATION PROCESSING DEVICE AND METHOD

(71) Applicant: FUJITSU LIMITED, Kawasaki (JP)

(72) Inventors: Takeshi Miyamae, Kawasaki (JP); Takeo Honda, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 294 days.

(21) Appl. No.: 15/851,777

(22) Filed: Dec. 22, 2017

(65) Prior Publication Data
US 2018/0181309 A1    Jun. 28, 2018

(30) Foreign Application Priority Data

Dec. 26, 2016    (JP) .............................. JP2016-251415

(51) Int. Cl.
*G06F 16/28*    (2019.01)
*G06F 21/31*    (2013.01)
(Continued)

(52) U.S. Cl.
CPC ............ *G06F 3/065* (2013.01); *G06F 3/0607* (2013.01); *G06F 3/067* (2013.01); *G06F 7/544* (2013.01);
(Continued)

(58) Field of Classification Search
CPC .... G06Q 2220/00; G06Q 20/00; G06Q 20/36; G06Q 20/367; G06Q 20/3674; G06Q 20/40
See application file for complete search history.

(56) References Cited

U.S. PATENT DOCUMENTS 8,601,000 B1    12/2013    Stefani et al.
10,972,475 B1*    4/2021    Zaki ..................... H04L 63/107
(Continued)

FOREIGN PATENT DOCUMENTS

JP    5-298497 A    11/1993
JP    2006-18540 A    1/2006

OTHER PUBLICATIONS

Binh Q. Nguyen et al., "fabric/protocol-spec.md at master.hyperledger/fabric.GitHub:" [online], [retrieved on Dec. 19, 2016], the Internet <URL: https://github.com/hyperledger/fabric /blob/master/docs/protocol-spec.md>.
(Continued)

*Primary Examiner* — Nicholas R Taylor
*Assistant Examiner* — Ho T Shiu
(74) *Attorney, Agent, or Firm* — Xsensus LLP

(57) ABSTRACT

A non-transitory computer-readable storage medium storing a program that causes a first computer to execute a process, the process including, receiving an update request from a second computer, the update request including an identifier of data stored in a storage device, an arithmetic operator of a calculation for the data, and an argument value used for the calculation, the calculation being one of four arithmetic calculation and bit calculation, the data being stored in the storage device that denies an access from the second computer, executing the calculation for a value of the data based on the arithmetic operator and the argument value, the calculation executed by the first computer being limited to the four arithmetic calculation or the bit calculation, updating the value of the data to an output value of the executed calculation, and transmitting response information corresponding to the update request to the second computer.

10 Claims, 11 Drawing Sheets

(51) Int. Cl.
  *G06N 20/00*  (2019.01)
  *G06N 5/04*  (2006.01)
  *H04L 29/06*  (2006.01)
  *G06F 3/06*  (2006.01)
  *G06F 9/455*  (2018.01)
  *G06F 7/544*  (2006.01)
  *H04L 29/08*  (2006.01)
  *G06F 9/52*  (2006.01)

(52) U.S. Cl.
  CPC ............ *G06F 9/45558* (2013.01); *G06F 9/52* (2013.01); *H04L 67/1095* (2013.01); *G06F 2009/45595* (2013.01)

(56) References Cited

U.S. PATENT DOCUMENTS

| | | | |
|---|---|---|---|
| 2017/0243222 A1* | 8/2017 | Balasubramanian | ........................ G06Q 20/4014 |
| 2018/0088928 A1* | 3/2018 | Smith | ...................... H04L 67/34 |
| 2018/0150799 A1* | 5/2018 | Hunt | ...................... H04L 9/3297 |

OTHER PUBLICATIONS

Japanese Office Action dated Sep. 29, 2020, in corresponding Japanese Patent Application No. 2016-251415.

\* cited by examiner

NON-TRANSITORY COMPUTER-READABLE STORAGE MEDIUM, AND INFORMATION PROCESSING DEVICE AND METHOD

CROSS-REFERENCE TO RELATED APPLICATION

This application is based upon and claims the benefit of priority of the prior Japanese Patent Application No. 2016-251415, filed on Dec. 26, 2016, the entire contents of which are incorporated herein by reference.

FIELD

The embodiment discussed herein is related to a non-transitory computer-readable storage medium, an information processing device, and an information processing method.

BACKGROUND

There is a technology that creates a user space, or a so-called container, separated from another user space by container-based virtualization. There is also a technology that operates a virtual machine on a computer. As a related technology, there is, for example, a technology referred to as a smart contract, which updates the data of a blockchain by a program described by a user on a system of the blockchain, the blockchain being a technology of making an indefinite number of nodes coupled on a peer-to-peer basis share data.

CITATION LIST

Non Patent Document

[Non Patent Document 1] "fabric/protocol-spec.md at master•hyperledger/fabric•GitHub:" [Online], [retrieved on Dec. 19, 2016], the Internet <URL: https://github.com/hyperledger/fabric/blob/master/docs/protocol-spec.md>

SUMMARY

According to an aspect of the embodiment, a non-transitory computer-readable storage medium storing a program that causes a first computer to execute a process, the process including, receiving an update request from a second computer, the update request including an identifier of data stored in a storage device, an arithmetic operator of a calculation for the data, and an argument value used for the calculation, the calculation being one of four arithmetic calculation and bit calculation, the data being stored in the storage device that denies an access from the second computer, executing the calculation for a value of the data based on the arithmetic operator and the argument value, the calculation executed by the first computer being limited to the four arithmetic calculation or the bit calculation, updating the value of the data to an output value of the executed calculation, and transmitting response information corresponding to the update request to the second computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Here, in the system of the blockchain, container-based virtualization may be used to maintain security. Further, in the system of the blockchain, based on a reading request and a writing request from one of two processes included in different containers, the value of a storage area accessible by the other process may be updated. However, processing time may be increased when the value of the storage area accessible by the other process is updated based on the reading request and the writing request from the one of the two processes included in the different containers. For example, when some value is added to the value of the storage area accessible by the other process, the one process transmits a reading request to the other process, reads the above-described value, and transmits a value obtained by adding some value to the read value as a writing request to the other process. Because two requests are thus issued to the value of one storage area, the larger the number of storage areas whose values are to be updated, the larger the number of requests issued. A total processing time is consequently increased.

In one aspect, it is an object of the embodiment discussed herein to reduce the number of requests involved in updating the value of a storage area between processes generated by container-based virtualization or between processes on different virtual machines or between processes on different computers.

Figure 1:
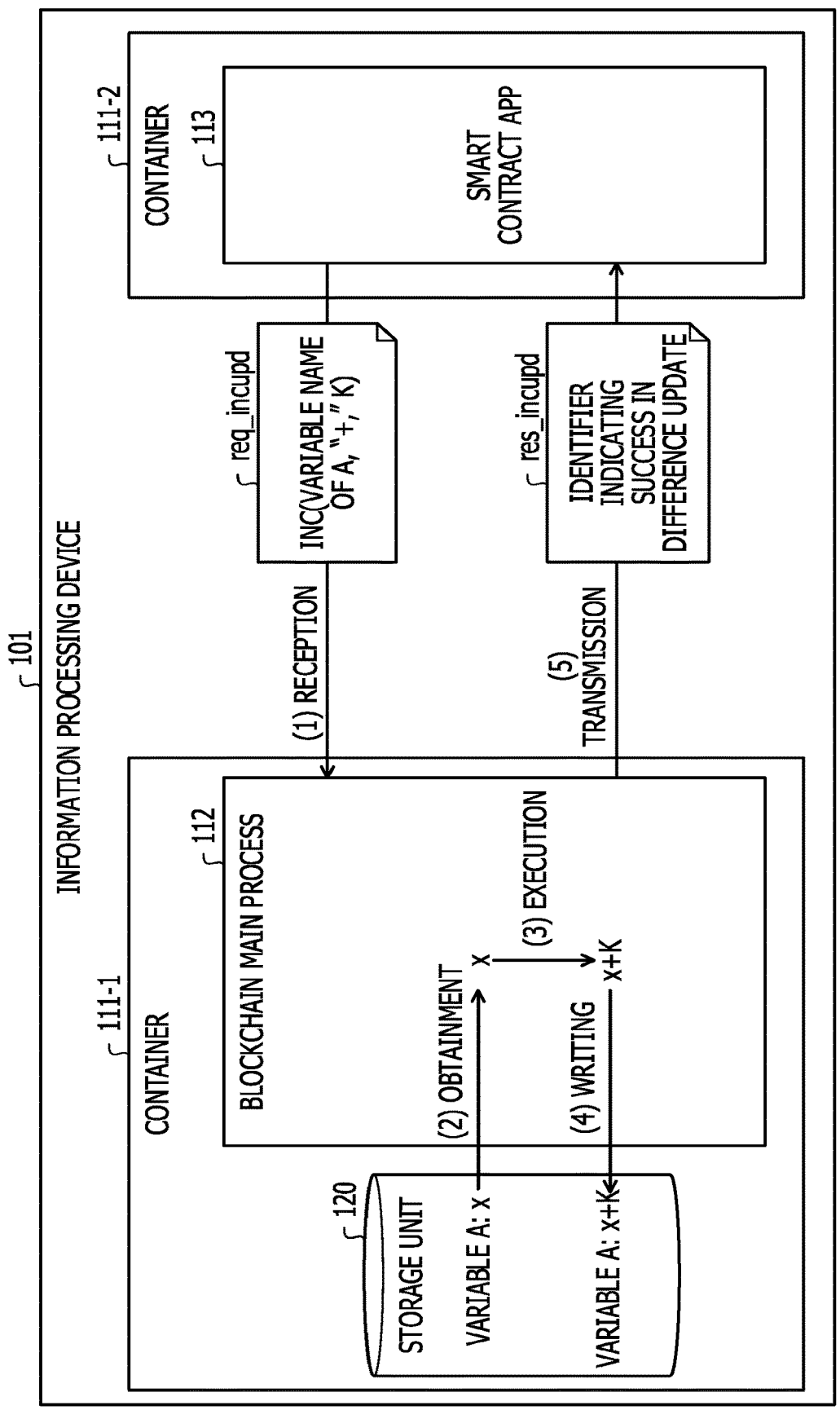
FIG. 1 is a diagram of assistance in explaining an example of operation of an information processing device according to a present embodiment.

FIG. 1 is a diagram of assistance in explaining an example of operation of an information processing device according to a present embodiment. An information processing device 101 illustrated in FIG. 1 is a computer that operates processes on virtual machines or processes generated by container-based virtualization or processes for which no virtualization technology is used. The information processing device 101 is, for example, a physical server.

A virtual machine is a computer system virtually created using hardware resources. In addition, container-based virtualization is a technology that generates a user space separated from another user space within one operating system (OS), the user spaces being referred to as containers, and which implements different OS environments for the respective separated user spaces. The generated user space will hereinafter be referred to as a "container." An example of the container-based virtualization technology is Docker (registered trademark), for example, which is a container-based virtualization environment. A process generated by the container-based virtualization is, for example, a process included in a container.

There is also a technology referred to as a blockchain, which is a technology that makes an indefinite number of nodes coupled on a peer-to-peer basis share data. The blockchain may make it difficult to tamper with data. Services using the blockchain include Bitcoin. There is also a technology referred to as a smart contract, which updates data of the blockchain by a program described by a user on the system of the blockchain. Examples of smart contracts include Ethereum, Hyperledger Fabric, and the like. Here, in Hyperledger Fabric, the blockchain is referred to as a "Peer," and application logic as a smart contract is referred to as a "Chaincode."

In the following description, a process providing the service of a blockchain within the system of the blockchain will be referred to as a "blockchain main process." In addition, application software as a smart contract, which is described by a user, will be referred to as a "smart contract app." The blockchain main process and the smart contract app each constitute one process.

The smart contract app is, for example, described by a program language that may use a library or the like that may access the resources of an OS. Hence, when the blockchain main process and the smart contract app are operated on one device, the operation of the blockchain main process may be stopped by a malicious smart contract app.

Accordingly, in order to ensure security, the blockchain main process and the smart contract app may be operated on different containers. Then, exchanges between the blockchain main process and the smart contract app are performed by specific communications of a reading request and a writing request. Security may be thereby ensured. A protocol between the Chaincode and the Peer in Hyperledger Fabric is described in "3.3.2 Chaincode Protocol" of <URL: https://github.com/hyperledger/fabric/blob/master/docs/protocol-spec.md>, which is a document listed in Non Patent Document. In the following, according to the above-described protocol, a reading request will be referred to as "GET_STATE," and a writing request will be referred to as "PUT_STATE."

When GET_STATE and PUT_STATE are used in transactions of transferring a certain balance from an account A to an account B, for example, four requests occur between the containers, as illustrated in the following. Here, all of the four requests are requests from the smart contract app to the blockchain main process. A first communication is GET_STATE that reads a value from a storage area storing the balance of the account A. A second communication is PUT_STATE that writes, as the value of the account A, a value obtained by subtracting the certain balance from the read value of the account A to the above-described storage area. A third communication is GET_STATE that reads a value from a storage area storing the balance of the account B. A fourth communication is PUT_STATE that writes, as the value of the account B, a value obtained by adding the certain balance to the read value of the account B to the above-described storage area.

When the smart contract app is to thus update the values of the storage areas accessible by the blockchain main process, two requests are issued to one storage area. Hence, the larger the number of storage areas whose values are to be updated, the larger the number of requests issued.

Here, as a method of increasing the speed of operation of the smart contract app, transactions of the smart contract app may be carried out in parallel with each other, for example. However, whereas transactions having no dependence relation to each other may be carried out in parallel with each other, it is difficult to carry out transactions having dependence relation to each other in parallel with each other.

In addition, the smart contract app may make the blockchain main process execute arbitrary instructions, and one request may be made to execute the arbitrary instructions for one storage area. However, when arbitrary instructions are allowed to be executed externally, the security of the blockchain main process is decreased.

Accordingly, in the present embodiment, description will be made of adding a difference update function to the blockchain main process. The difference update function is a function of operation performed by the blockchain main process when receiving the identification information of a storage area and a difference value from a present value stored in the storage area. The operation performed by the blockchain main process is four arithmetic operations or bit operations in order to ensure security.

An example of operation of the information processing device 101 will be described with reference to FIG. 1. In the example of FIG. 1, each information processing device 101 generates containers 111-1 and 111-2. Then, the information processing device 101 operates a blockchain main process 112 as a process within the container 111-1, and operates a smart contract app 113 as another process within the container 111-2. In the following description, when elements of a same kind are distinguished from each other, reference symbols are used as in the "container 111-1" and the "container 111-2," and when elements of a same kind are not distinguished from each other, only a common number of reference symbols, as in a "container 111," may be used. In addition, in the present embodiment, the blockchain main process 112 carries out a method according to the present embodiment.

In FIG. 1, the smart contract app 113 increases, by a certain value, the value of a storage area within a storage unit 120 accessible by the blockchain main process 112. In addition, it is difficult for the smart contract app 113 to access the storage unit 120. A variable indicating a storage area may be set to the storage area. In the example of FIG. 1, description will be made supposing that the variable indicating the storage area is a variable A, and that the value of the variable A is set as a certain value and increased by K.

As indicated by (1) in FIG. 1, the blockchain main process 112 receives a difference update request req_incupd from the smart contract app 113 included in the container 111-2. When the blockchain main process 112 receives the difference update request req_incupd, the blockchain main process 112 performs the difference update function. Here, the difference update request req_incupd includes the identification information of a storage area of the storage unit 120, information indicating one operation of four arithmetic operations or bit operations, and a difference value for a value stored in the storage area.

The identification information of the storage area is, for example, a variable name. The identification information of the storage area may also be a name indicating one field included in one record within a database. The information indicating the one operation of the four arithmetic operations or the bit operations may, for example, be an operator indicating the one operation of the four arithmetic operations or the bit operations, or may be a character string. Additions, subtractions, multiplications, and divisions are referred to collectively as the four arithmetic operations. Operators indicating the four arithmetic operations are, for example, "+," "−," "×," and "/." The bit operations are, for example, a logical sum, a logic product, and an exclusive disjunction. In addition, operators indicating the bit operations are, for example, "&," "|," and "^." In addition, when a bit operation is an exclusive disjunction, a character string indicating the bit operation is, for example, "XOR." The difference value for the value stored in the storage area is a value as an argument when the one operation is executed. The difference update request req_incupd illustrated in FIG. 1 includes the variable name of the variable A, "+," which is an operator indicating addition, and K as the difference value.

Next, as indicated by (2) in FIG. 1, in response to receiving the difference update request req_incupd, the blockchain main process 112 obtains the value stored in the storage area identified from the difference update request req_incupd from the storage unit 120. In the example of FIG. 1, the blockchain main process 112 obtains the value x of the variable A from the storage unit 120.

Then, as indicated by (3) in FIG. 1, the blockchain main process 112 executes the one operation identified from the difference update request req_incupd on the obtained value using the difference value as an argument. In the example of FIG. 1, the blockchain main process 112 adds K to x.

As indicated by (4) in FIG. 1, when an operation result of the above-described one operation indicates success, the blockchain main process 112 writes an output value of the above-described one operation, the output value being obtained based on the above-described operation result, to the storage area identified from the difference update request req_incupd. Here, when the one operation succeeds as the operation result of the one operation, the output value of the one operation is obtained, and when the one operation fails, an identifier indicating a reason for the failure or the like is obtained. In addition, an identifier indicating a success or failure of the one operation and the output value of the one operation in a case where the one operation succeeds may be obtained as the operation result. In the example of FIG. 1, the above-described one operation succeeds, and therefore the blockchain main process 112 writes x+K to the variable A. The one operation may also fail. The blockchain main process 112 may, for example, determine that the one operation fails when the one operation is addition or multiplication, and a value obtained as a result of executing the operation exceeds a set maximum value. In addition, the blockchain main process 112 may determine that the one operation fails when the one operation is division and the difference value is zero, because division by zero occurs.

Then, as indicated by (5) in FIG. 1, the blockchain main process 112 transmits, to the smart contract app 113, response information res_incupd of the difference update request req_incupd, the response information res_incupd being based on the operation result of the one operation. In the example of FIG. 1, the blockchain main process 112 transmits an identifier indicating that the difference update has succeeded as the response information res_incupd to the smart contract app 113.

The blockchain main process 112 may thereby reduce the number of requests for updating one variable from two to one. Further, security may be maintained because the blockchain main process 112 executes only limited operations such as the four arithmetic operations or the bit operations based on requests from the smart contract app 113.

For example, in transactions of transferring a certain balance from the account A to the account B, two INC instructions suffice in the present embodiment. In addition, the present embodiment may also be applied to other than the transactions of transferring a certain balance from the account A to the account B. For example, the present embodiment may also be applied to transactions of incrementing or decrementing a certain value. For example, when no INC instruction is used, GET_STATE and PUT_STATE occur, GET_STATE reading a certain value and PUT_STATE writing a value obtained by incrementing the read value. On the other hand, in the present embodiment, one INC instruction suffices, and therefore the number of requests may be reduced.

Incidentally, while the blockchain main process 112 and the smart contract app 113 are processes included within the respective different containers 111 in the description of FIG. 1, the blockchain main process 112 and the smart contract app 113 are not limited to this. For example, the blockchain main process 112 and the smart contract app 113 may be processes on respective different virtual machines. In addition, the blockchain main process 112 and the smart contract app 113 may be processes on respective different computers. An example in which the information processing device 101 is applied to a system will next be described with reference to FIG. 2.

Figure 2:
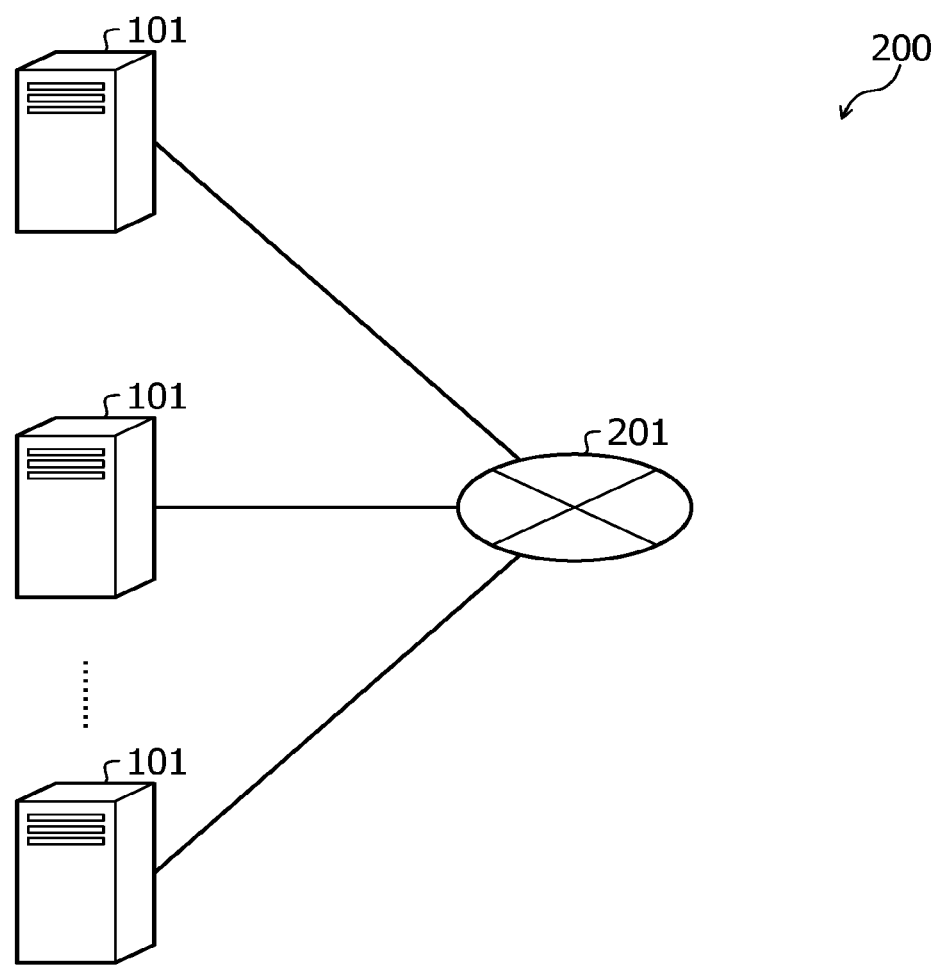
FIG. 2 is a diagram of assistance in explaining an example of configuration of a system.

FIG. 2 is a diagram of assistance in explaining an example of configuration of a system. A system 200 illustrated in FIG. 2 includes a plurality of information processing devices 101. Each of the plurality of information processing devices 101 is coupled by a network 201 such as the Internet, a local area network (LAN), a wide area network (WAN), or the like. There are, for example, a few to a few ten information processing devices 101 included in the system 200. Next, referring to FIG. 3, description will be made of an example of hardware configuration of an information processing device 101.

Figure 3:
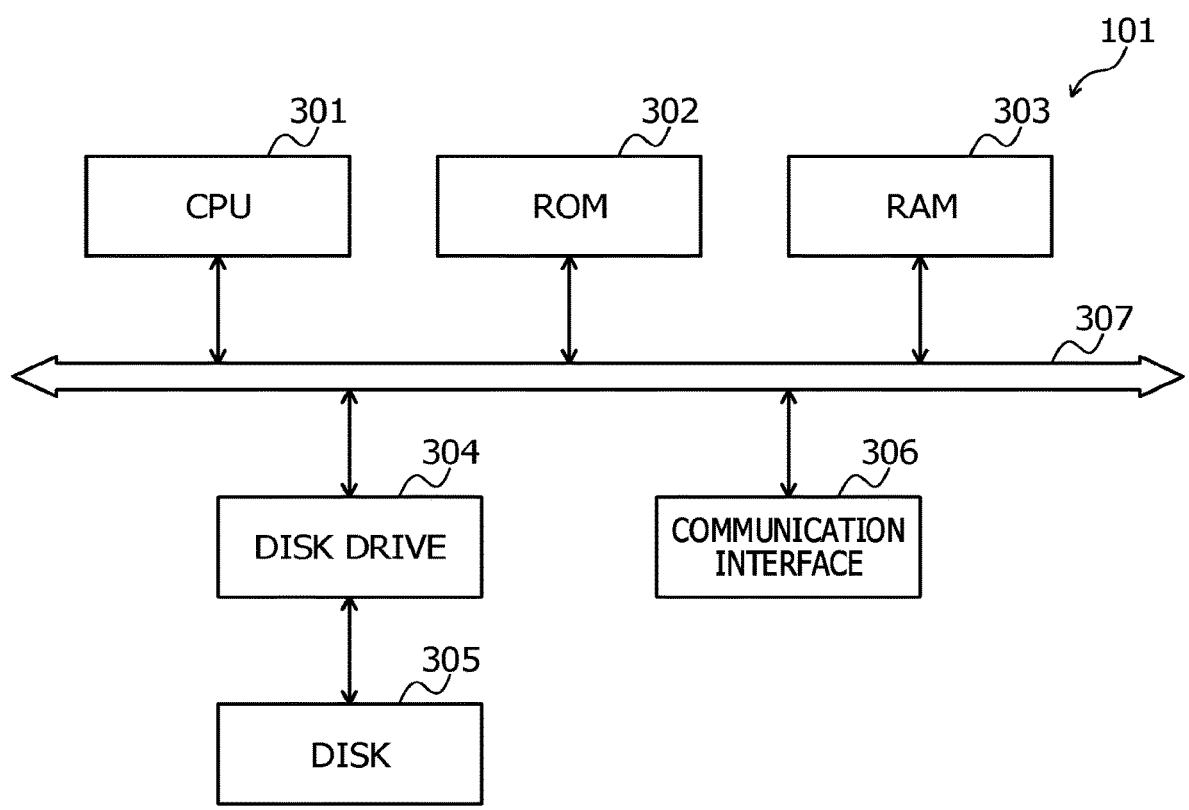
FIG. 3 is a diagram of assistance in explaining an example of hardware configuration of an information processing device.

FIG. 3 is a diagram of assistance in explaining an example of hardware configuration of an information processing device. The information processing device illustrated in FIG. 3 may be the information processing device 101 illustrated in FIG. 1. The information processing device 101 in FIG. 3 includes a central processing unit (CPU) 301, a read-only memory (ROM) 302, and a random access memory (RAM) 303. The information processing device 101 also includes a disk drive 304 and a disk 305 as well as a communication interface 306. In addition, the CPU 301, the ROM 302, the RAM 303, the disk drive 304, and the communication interface 306 are each coupled by a bus 307.

The CPU 301 is an arithmetic processing device that controls the whole of the information processing device 101. The ROM 302 is a nonvolatile memory that stores a program such as a boot program or the like. The RAM 303 is a volatile memory used as a work area for the CPU 301.

The disk drive 304 is a control device that controls the reading and writing of data from and to the disk 305 under control of the CPU 301. A magnetic disk drive, an optical disk drive, a solid-state drive, or the like, for example, may be employed as the disk drive 304. The disk 305 is a nonvolatile memory that stores data written under control of the disk drive 304. When the disk drive 304 is a magnetic disk drive, for example, a magnetic disk may be employed as the disk 305. In addition, when the disk drive 304 is an optical disk drive, an optical disk may be employed as the disk 305. In addition, when the disk drive 304 is a solid-state drive, a semiconductor memory formed by a semiconductor element, or a so-called semiconductor disk, may be employed as the disk 305.

The communication interface 306 is a control device that interfaces between the network 201 and the inside, and controls input or output of data from another device. For example, the communication interface 306 is coupled to the other device via the network 201 through a communication line. A modem, a LAN adapter, or the like, for example, may be employed as the communication interface 306.

In addition, in a case where an administrator of the information processing device 101 directly operates the information processing device 101, the information processing device 101 may include hardware such as a display, a keyboard, and a mouse.

Figure 4:
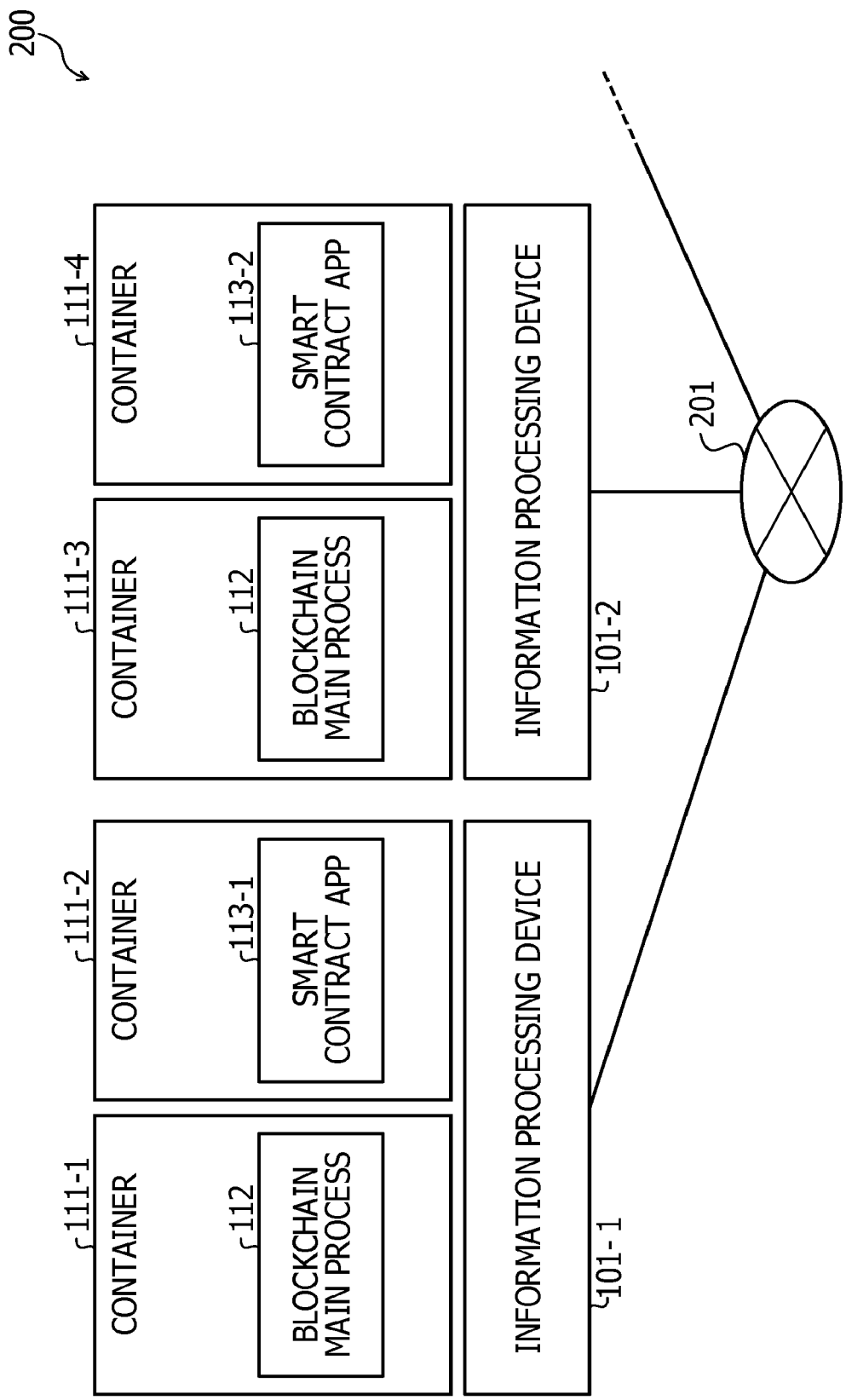
FIG. 4 is a diagram of assistance in explaining an example of software configuration of an information processing device.

FIG. 4 is a diagram of assistance in explaining an example of software configuration of information processing devices. The information processing devices illustrated in FIG. 4 may be the information processing device 101 illustrated in FIG. 1. Software operating on a plurality of information processing devices 101 will be described with reference to FIG. 4. Blockchain main processes 112 and smart contract apps 113 operate within respective containers 111-1 to 111-4 on information processing devices 101-1 and 101-2 of the plurality of information processing devices 101.

Here, the blockchain main processes 112 operating on the respective information processing devices 101 are all a same program. Thus, even when a failure occurs in some information processing devices 101 of the plurality of information processing devices 101, the operation of the system 200 may be continued by the blockchain main processes 112 on the remaining information processing devices 101. Hence, the availability of the system 200 may be improved.

Figure 5:
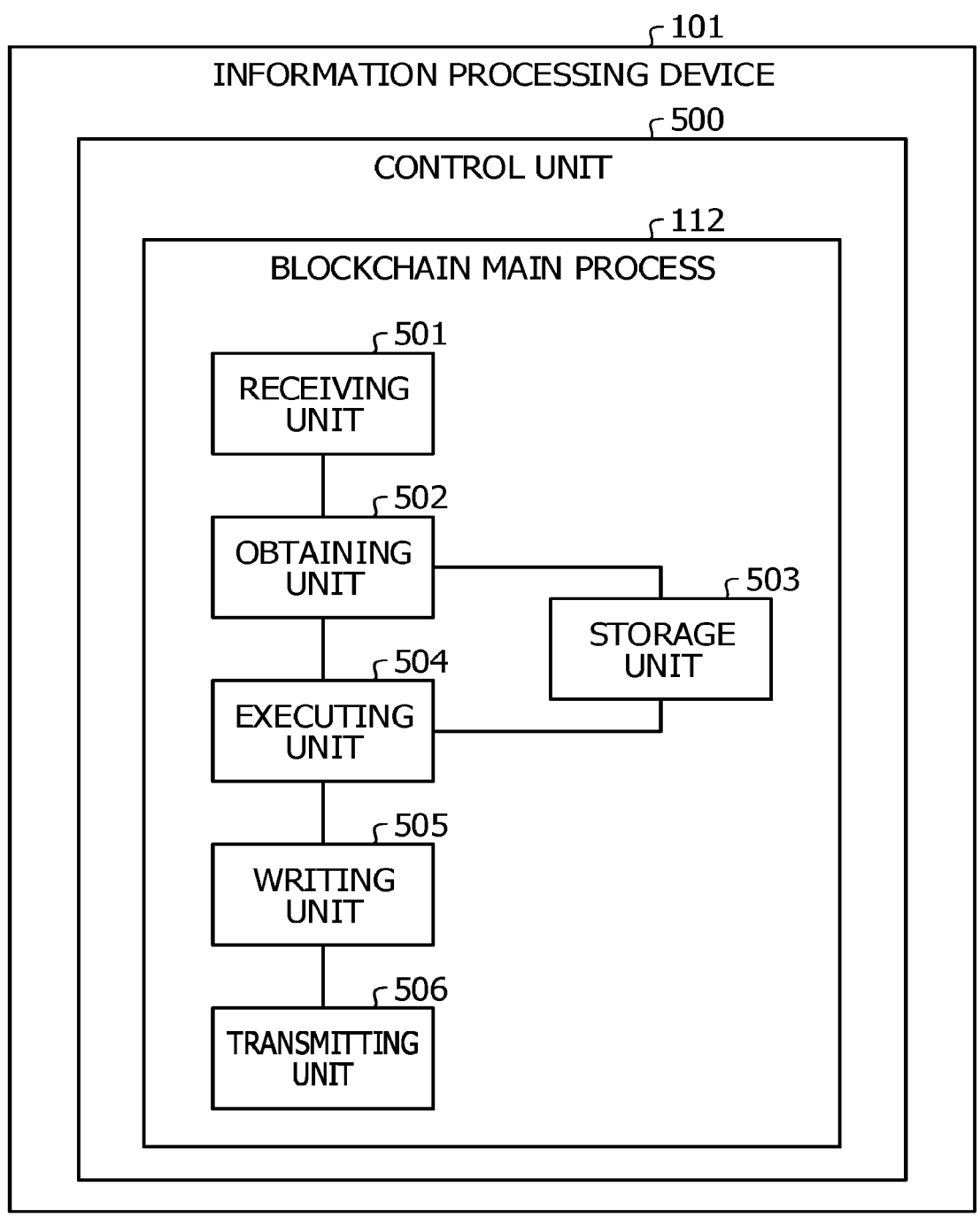
FIG. 5 is a diagram of assistance in explaining an example of functional configuration of an information processing device.

FIG. 5 is a diagram of assistance in explaining an example of functional configuration of an information processing device. The information processing device illustrated in FIG. 5 may be the information processing device 101 illustrated in FIG. 1. The information processing device 101 includes a control unit 500. The control unit 500 includes a receiving unit 501, an obtaining unit 502, a storage unit 503, an executing unit 504, a writing unit 505, and a transmitting unit 506. The control unit 500 implements functions of the respective parts when the CPU 301 executes a program stored in a storage device. The storage device is, for example, the ROM 302, the RAM 303, or the disk 305 illustrated in FIG. 3 or the like. In addition, processing results of the respective parts are stored in the RAM 303, a register of the CPU 301, a cache memory of the CPU 301, or the like.

The receiving unit 501 receives a difference update request from the smart contract app 113. The receiving unit 501 also receives a collective update request including a plurality of difference update requests from the smart contract app 113. In the following, a difference update request will be referred to as an "INC instruction." Similarly, a collective update request will be referred to as a "SUBTRAN instruction." A SUBTRAN instruction may include PUT_STATE in addition to one or more INC instructions.

As illustrated in FIG. 1, an INC instruction includes the identification information of a storage area within the storage unit 120, information indicating one operation of the four arithmetic operations or the bit operations, and a difference value for a value stored in the storage area within the storage unit 120. The storage unit 120 is, for example, the RAM 303. In the following description, to simplify the description, suppose that a variable is set to the storage area within the storage unit 120.

Description will first be made of a case of receiving the INC instruction. In response to reception of the INC instruction by the receiving unit 501, the obtaining unit 502 obtains the value of the variable identified from the INC instruction from the storage unit 120.

The executing unit 504 executes the one operation identified from the INC instruction on the value obtained by the obtaining unit 502 using the difference value as an argument.

When an operation result of the above-described one operation by the executing unit 504 indicates success, the writing unit 505 writes an output value of the above-described one operation, the output value being obtained based on the above-described operation result, to the variable identified from the INC instruction.

The transmitting unit 506 transmits INC instruction response information based on the operation result of the above-described one operation to the smart contract app 113. The response information will hereinafter be described as "RESPONSE." RESPONSE is, for example, an identifier indicating that the difference update has succeeded or an identifier indicating that the difference update has failed.

Description will next be made of a case of receiving a SUBTRAN instruction. In response to reception of the SUBTRAN instruction by the receiving unit 501, and in correspondence with each INC instruction of a plurality of INC instructions included in the SUBTRAN instruction, the obtaining unit 502 obtains a value stored in a variable identified from each INC instruction from the storage unit 120.

In correspondence with each INC instruction, the executing unit 504 executes one operation identified from each INC instruction on the obtained value stored in a storage area identified from each INC instruction, using a difference value included in each INC instruction as an argument.

When an operation result of the one operation identified from each INC instruction indicates success, the writing unit 505 writes an output value of the above-described one operation, the output value being obtained based on the operation result identified from each INC instruction, to the variable identified from each INC instruction.

The transmitting unit 506 transmits, to the smart contract app 113, RESPONSE of the SUBTRAN instruction, in which response information the operation results of the one operations identified from each INC instruction are integrated. Here, the integration of the operation results represents putting together each operation result into one piece of information. For example, RESPONSE of the SUBTRAN instruction in which response information the operation results are integrated is, for example, an identifier indicating that the plurality of INC instructions have all succeeded or an identifier indicating that at least one of the plurality of INC instructions has failed.

In addition, in the SUBTRAN instruction, the blockchain main process 112 may have a function in which the blockchain main process 112 itself performs rollback without the smart contract app 113 performing rollback. When the blockchain main process 112 itself has the rollback function, the storage unit 503 may store the obtained value of the variable identified from each INC instruction in another storage area different from that of the variable. The other storage area is, for example, the RAM 303.

Then, suppose that at least one of the operation results of the one operations identified from each INC instruction indicates failure. In this case, the writing unit 505 writes the value stored in the above-described other storage area to the variable identified from each INC instruction. Thus, when at least one of the one operations identified from each INC instruction fails, the writing unit 505 performs rollback using the backed-up value. Here, occasion for rollback is not limited to the case where at least one of the one operations identified from each INC instruction fails. For example, in a case where the writing of the variable fails even when the one operations identified from each INC instruction succeed, the writing unit 505 performs rollback.

In addition, when at least one of the operation results indicates failure, the transmitting unit 506 transmits, as RESPONSE of SUBTRAN, information indicating failure in the one operations identified from each INC instruction to the smart contract app 113.

In addition, the SUBTRAN instruction may include one or more INC instructions and PUT_STATE as a writing request. PUT_STATE includes a variable name of the storage unit 120 and a value to be written to a corresponding variable. When the SUBTRAN instruction includes PUT_STATE, the storage unit 503 stores the value of the variable identified from the writing request to another storage area different from that of the corresponding variable.

Then, suppose that at least one of the operation results of the one operations identified from each INC instruction of the one or more INC instructions indicates failure. In this case, the writing unit 505 writes the value stored in the corresponding other storage area to the variable identified from the writing request. In addition, when one of the operation results indicates failure, the transmitting unit 506 transmits, as RESPONSE of the SUBTRAN instruction, information indicating failure in the one operations identified from each INC instruction described above to the smart contract app 113.

Figure 6:
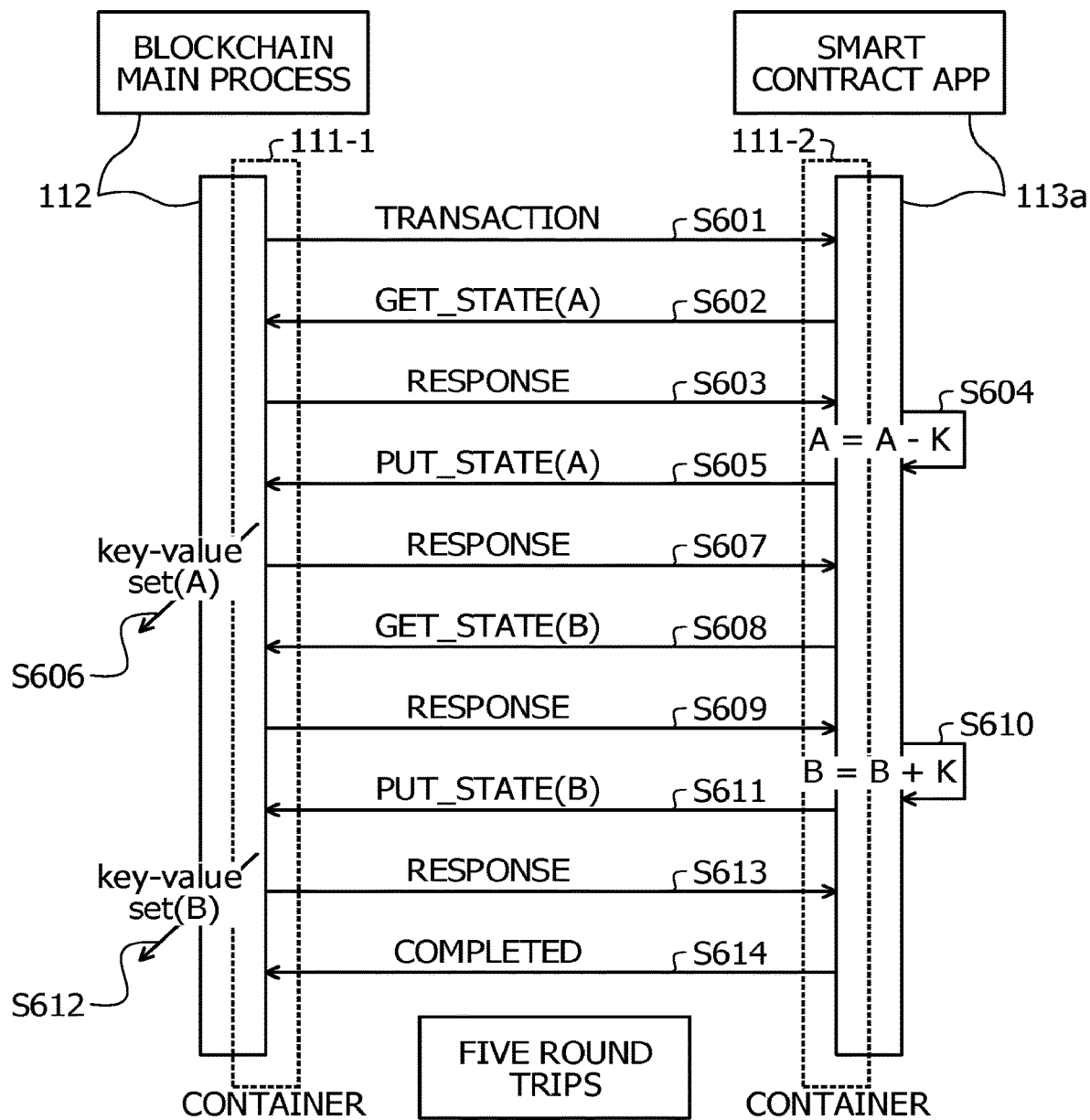
FIG. 6 is a diagram of assistance in explaining a sequence of a remote transaction system in a case where GET_STATE and PUT_STATE are used.
Figure 7:
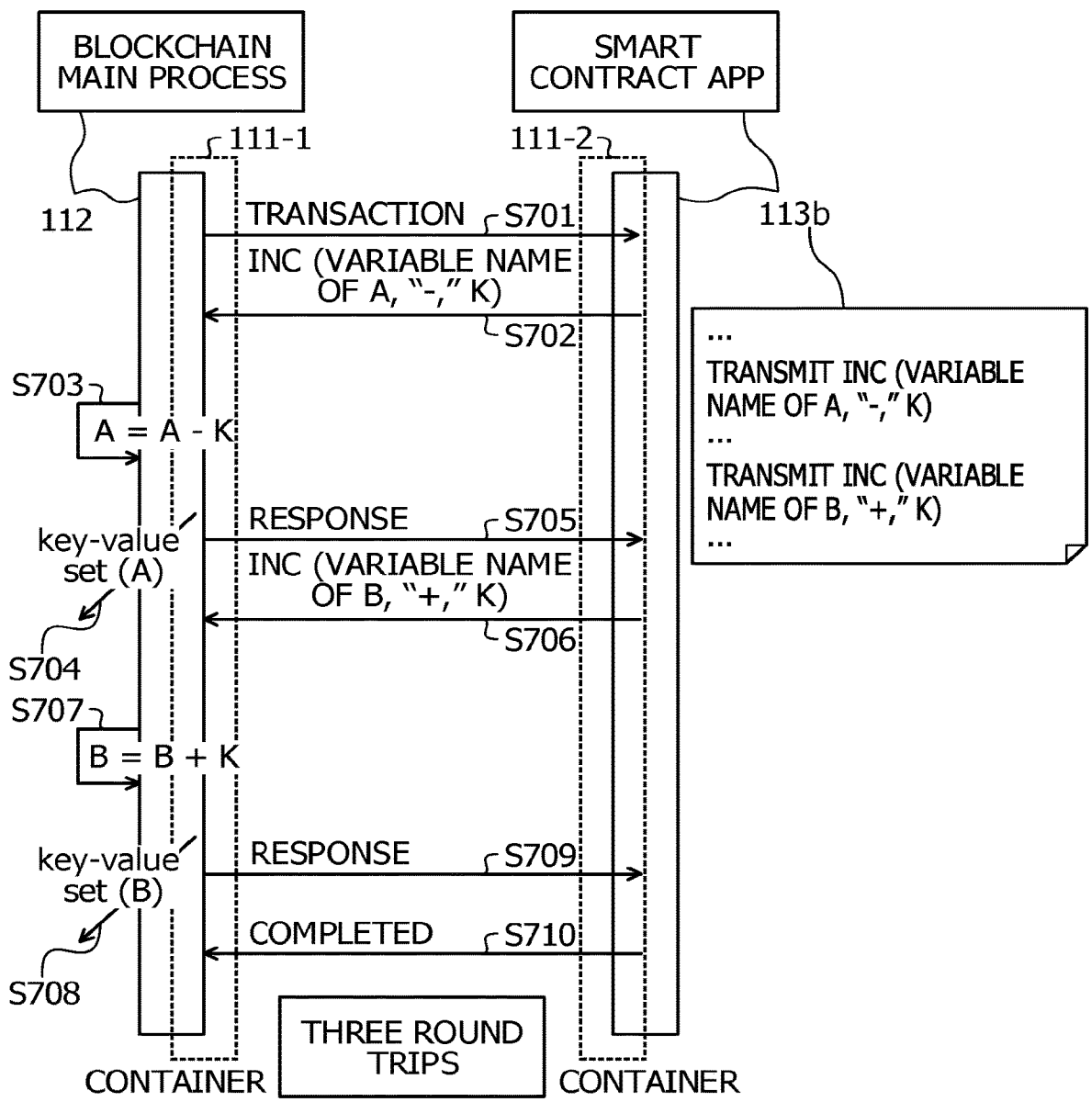
FIG. 7 is a diagram of assistance in explaining a sequence of a remote transaction system in a case where a difference update function is used.
Figure 8:
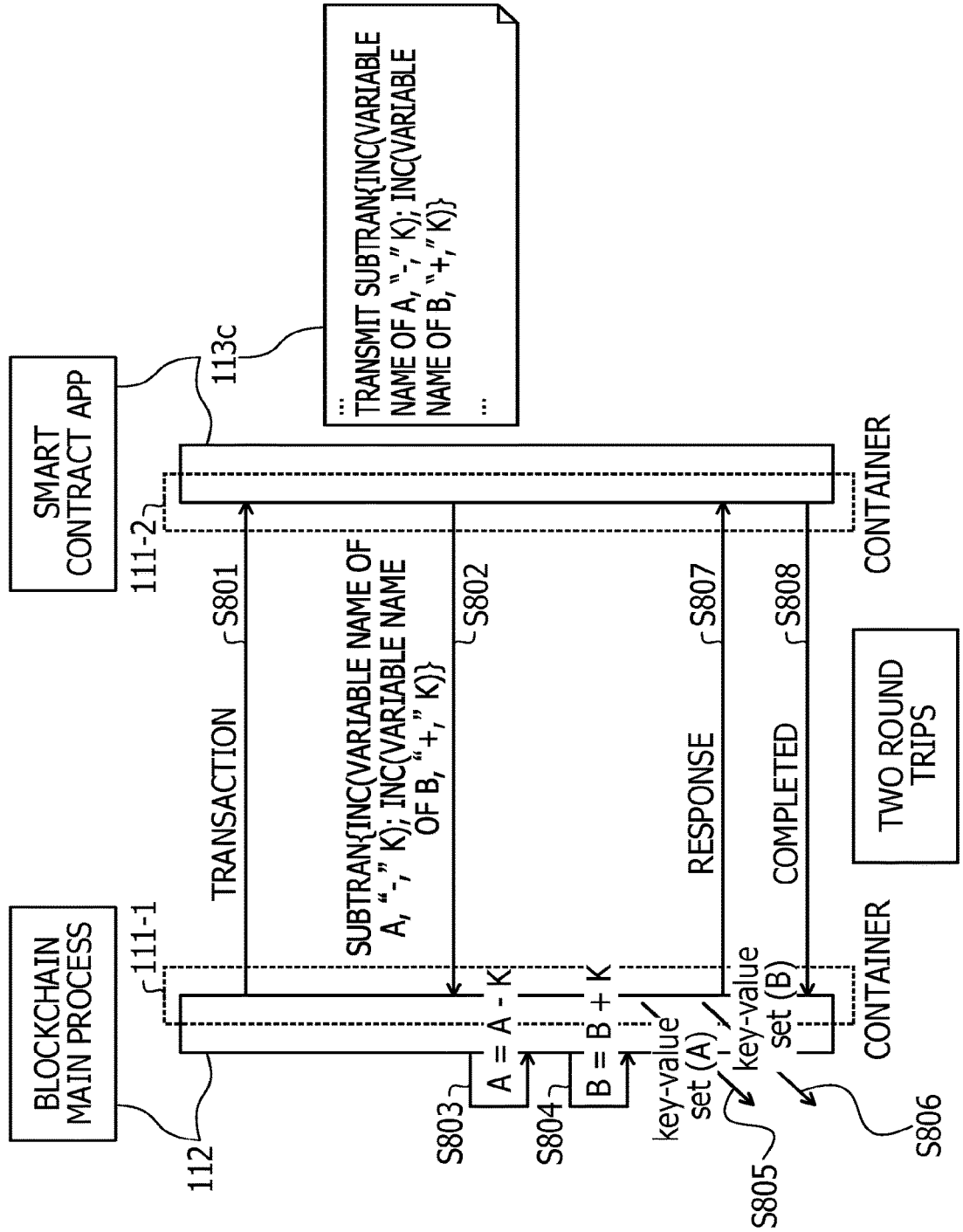
FIG. 8 is a diagram of assistance in explaining a sequence of a remote transaction system in a case where a difference update function and a collective update function are used.

Next, referring to FIGS. 6 to 8, description will be made of sequences of a remote transaction system in a case where GET_STATE and PUT_STATE are used, in a case where the difference update function is used, and in a case where the difference update function and a collective update function are used. Here, FIGS. 6 to 8 illustrate a series of processing in a case where all of the processing succeeds. In addition, suppose that the smart contract app 113 using GET_STATE and PUT_STATE illustrated in FIG. 6 is a smart contract app 113a. In addition, suppose that the smart contract app 113 using the difference update function illustrated in FIG. 7 is a smart contract app 113b. In addition, suppose that the smart contract app 113 using the difference update function and the collective update function illustrated in FIG. 8 is a smart contract app 113c. In addition, "K" used in FIGS. 6 to 8 is not a variable but a certain value.

FIG. 6 is a diagram of assistance in explaining a sequence of a remote transaction system in a case where GET_STATE and PUT_STATE are used. The blockchain main process 112 transmits TRANSACTION to the smart contract app 113a (step S601). Receiving TRANSACTION, the smart contract app 113a transmits GET_STATE(A) to the blockchain main process 112 (step S602). Receiving GET_STATE(A), the blockchain main process 112 transmits RESPONSE to the smart contract app 113a (step S603). Here, RESPONSE to GET_STATE( ) is a read value in a case where reading succeeds, or is an identifier indicating failure in a case where reading fails.

Receiving the value of A as RESPONSE, the smart contract app 113a executes A=A−K (step S604). Then, the smart contract app 113a transmits PUT_STATE(A) to the blockchain main process 112 with an operation result of A as an argument (step S605).

Receiving PUT_STATE(A), the blockchain main process 112 executes key-value set (A) (step S606), and transmits RESPONSE to the smart contract app 113a (step S607). Here, RESPONSE to PUT_STATE( ) is an identifier indicating whether or not writing has succeeded.

Receiving the identifier indicating that writing has succeeded as RESPONSE, the smart contract app 113a transmits GET_STATE(B) to the blockchain main process 112 (step S608). Receiving GET_STATE(B), the blockchain main process 112 transmits RESPONSE to the smart contract app 113a (step S609).

Receiving the value of B as RESPONSE, the smart contract app 113a executes B=B+K (step S610). Then, the smart contract app 113a transmits PUT_STATE(B) to the blockchain main process 112 with an operation result of B as an argument (step S611).

Receiving PUT_STATE(B), the blockchain main process 112 executes key-value set (B) (step S612), and transmits RESPONSE to the smart contract app 113a (step S613). Receiving an identifier indicating that writing has succeeded as RESPONSE, the smart contract app 113a transmits COMPLETED to the blockchain main process 112 (step S614). Here, COMPLETED is an instruction notifying that the processing of TRANSACTION is completed.

As described above, in the sequence of the remote transaction system in the case where GET_STATE and PUT_STATE are used, the number of requests between the blockchain main process 112 and the smart contract app 113a represents five round trips.

FIG. 7 is a diagram of assistance in explaining a sequence of a remote transaction system in a case where a difference update function is used. As illustrated in FIG. 7, a code of the smart contract app 113b includes "INC(the variable name of A, "−," K)" and "INC(the variable name of B, "+," K)" described by a developer of the smart contract app 113b or the like.

The blockchain main process 112 transmits TRANSACTION to the smart contract app 113b (step S701). Receiving TRANSACTION, the smart contract app 113b transmits INC(the variable name of A, "−," K) to the blockchain main process 112 (step S702).

Receiving INC(the variable name of A, "−," K), the blockchain main process 112 executes A=A−K (step S703), executes key-value set (A) (step S704), and transmits RESPONSE to the smart contract app 113b (step S705). A concrete processing procedure of the blockchain main process 112 when receiving INC( ) will be described with reference to FIG. 11. Here, RESPONSE to INC( ) is an identifier indicating whether or not the difference update has succeeded.

Receiving an identifier indicating that the difference update has succeeded as RESPONSE, the smart contract app 113b transmits INC(the variable name of B, "+," K) to the blockchain main process 112 (step S706).

Receiving INC(the variable name of B, "+," K), the blockchain main process 112 executes B=B+K (step S707), executes key-value set (B) (step S708), and transmits RESPONSE to the smart contract app 113b (step S709).

Receiving an identifier indicating that the difference update has succeeded as RESPONSE, the smart contract app 113b transmits COMPLETED to the blockchain main process 112 (step S710).

As described above, in the sequence of the remote transaction system in the case where the difference update function is used, the number of requests between the blockchain main process 112 and the smart contract app 113b represents three round trips.

FIG. 8 is a diagram of assistance in explaining a sequence of a remote transaction system in a case where a difference update function and a collective update function are used. As illustrated in FIG. 8, a code of the smart contract app 113c includes "SUBTRAN{INC(the variable name of A, "−," K); INC(the variable name of B, "+," K)}" described by the developer of the smart contract app 113c or the like.

The blockchain main process 112 transmits TRANSACTION to the smart contract app 113c (step S801). Receiving TRANSACTION, the smart contract app 113c transmits SUBTRAN{INC(the variable name of A, "−," K); INC(the variable name of B, "+," K)} (step S802).

Receiving SUBTRAN{INC(the variable name of A, "−," K); INC(the variable name of B, "+," K)}, the blockchain main process 112 sequentially executes instructions set as arguments in SUBTRAN{ }. For example, based on INC(the variable name of A, "−," K) as a first argument in SUBTRAN{ }, the blockchain main process 112 executes A=A−K (step S803), and executes key-value set (A) (step S805). In addition, based on INC(the variable name of B, "+," K) as a second argument in SUBTRAN{ }, the blockchain main process 112 executes B=B+K (step S804), and executes key-value set (B) (step S806). Here, when there is no dependence relation between the instructions set as the arguments in SUBTRAN{ }, as illustrated in FIG. 8, the blockchain main process 112 may execute the instructions in parallel with each other.

After the instructions set as the arguments all succeed, the blockchain main process 112 transmits RESPONSE to the smart contract app 113c (step S807). Here, RESPONSE to SUBTRAN{ } is an identifier indicating that the instructions set as the arguments have all succeeded or an identifier indicating that at least one of the instructions set as the arguments has failed.

Receiving an identifier indicating that the instructions specified as the arguments have all succeeded as RESPONSE, the smart contract app 113c transmits COMPLETED to the blockchain main process 112 (step S808).

As described above, in the sequence of the remote transaction system in the case where the difference update function and the collective update function are used, the number of requests between the blockchain main process 112 and the smart contract app 113c represents two round trips. By thus using the difference update function and the collective update function, it is possible to reduce the number of requests to ⅖, or improve performance 2.5 times, as compared with the case where GET and PUT are used.

Next, referring to FIG. 9, description will be made of examples of rollback processing in the case where GET and PUT are used and in the case where the difference update function and the collective update function are used.

Figure 9:
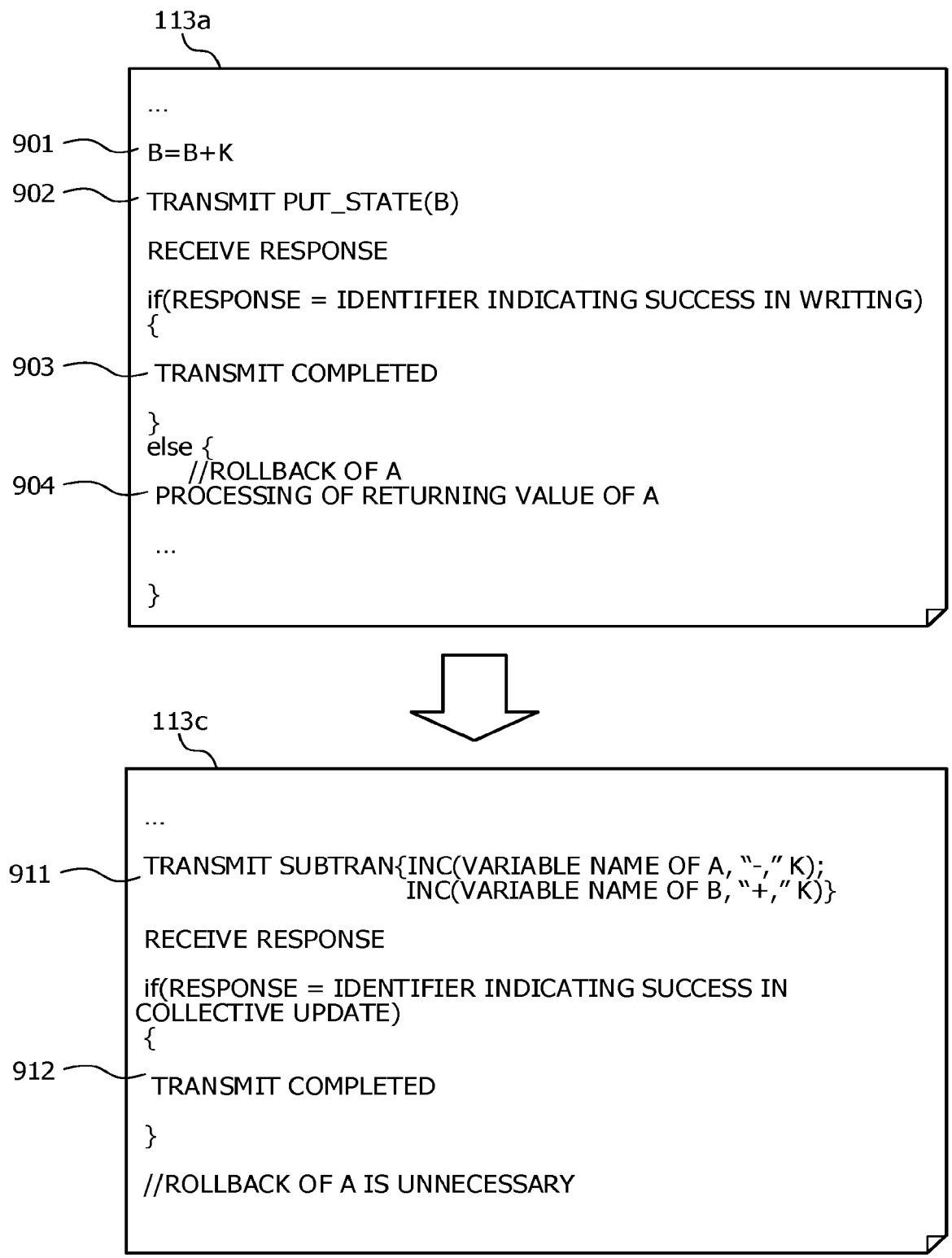
FIG. 9 is a diagram of assistance in explaining an example of rollback processing.

FIG. 9 is a diagram of assistance in explaining examples of rollback processing. The smart contract app 113a illustrated in an upper part of FIG. 9 represents, as a pseudo code, a part of the code of the smart contract app 113a illustrated in FIG. 6. Similarly, the smart contract app 113c illustrated in a lower part of FIG. 9 represents, as a pseudo code, a part of the code of the smart contract app 113c illustrated in FIG. 8.

When codes 901 to 903 of the smart contract app 113a illustrated in FIG. 9 are executed, each of the processing of steps S610, S611, and S614 is performed. The "processing of returning the value of A" as a code 904 of the smart contract app 113a, which code is executed when an identifier indicating that writing has failed is received as RESPONSE, is the rollback processing of A.

Here, the processing of returning the value of A is, for example, processing of storing the value of A before the update in advance and transmitting PUT_STATE(A) using the original value of A.

On the other hand, when codes 911 and 912 of the smart contract app 113c illustrated in FIG. 9 are executed, each of processing of steps S802 and S808 is performed. When receiving an identifier indicating that writing has failed as RESPONSE, the smart contract app 113c does not have to perform the rollback processing of A because the value of A is rolled back by the blockchain main process 112.

Next, processing performed by the blockchain main process 112 will be described with reference to FIG. 10 and FIG. 11.

Figure 10:
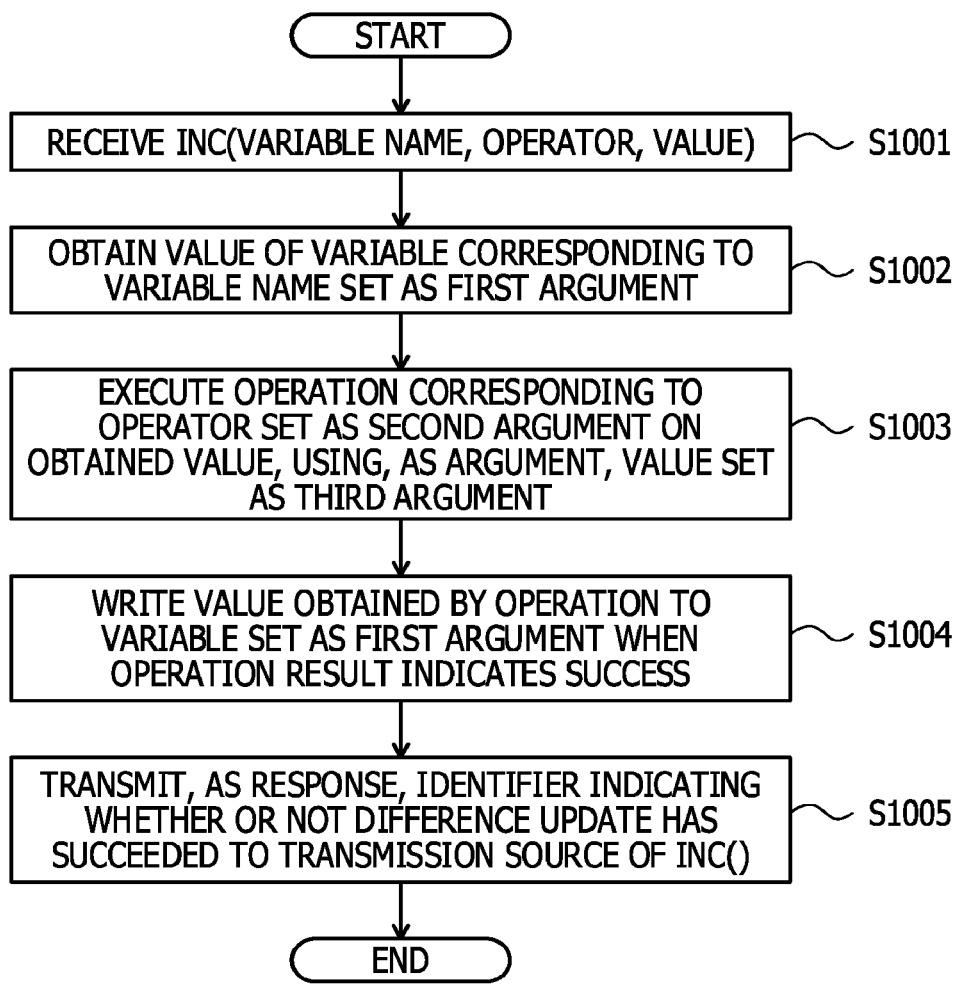
FIG. 10 is a flowchart illustrating an example of a processing procedure at a time of reception of an INC instruction.

FIG. 10 is a flowchart illustrating an example of a processing procedure at a time of reception of an INC instruction. The blockchain main process 112 receives INC(a variable name, an operator, a value) (step S1001). Next, the blockchain main process 112 obtains the value of a variable corresponding to the variable name set as a first argument (step S1002). Then, the blockchain main process 112 executes an operation corresponding to the operator set as a second argument on the obtained value, using, as an argument, the value set as a third argument (step S1003). Next, when a result of the operation indicates success, the blockchain main process 112 writes a value obtained by the operation to the variable set as the first argument (step S1004). Then, the blockchain main process 112 transmits, as RESPONSE, an identifier indicating whether or not the difference update has succeeded to a transmission source of INC( )(step S1005). After ending the processing of step S1005, the blockchain main process 112 ends the processing at the time of reception of the INC instruction.

Figure 11:
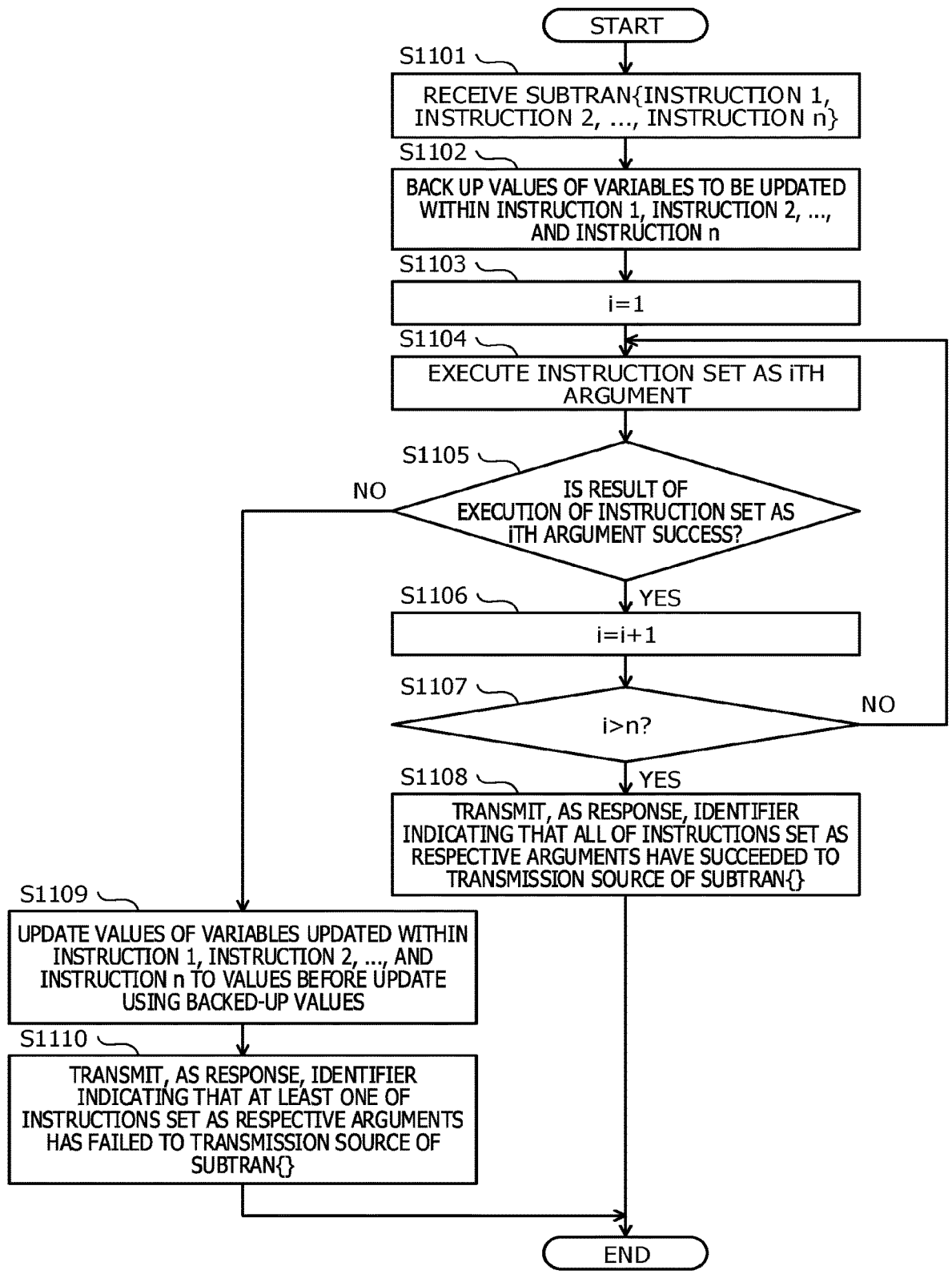
FIG. 11 is a flowchart illustrating an example of a processing procedure at a time of reception of a SUBTRAN instruction.

FIG. 11 is a flowchart illustrating an example of a processing procedure at a time of reception of a SUBTRAN instruction. The blockchain main process 112 receives SUBTRAN{an instruction 1, an instruction 2, . . . , an instruction n} (step S1101). The instruction 1, the instruction 2, . . . , and the instruction n are, for example, an INC instruction or PUT_STATE. Next, the blockchain main process 112 backs up the values of variables updated within the instruction 1, the instruction 2, . . . , and the instruction n (step S1102).

Then, the blockchain main process 112 assigns 1 to a variable i (step S1103). Next, the blockchain main process 112 executes an instruction set as an ith argument (step S1104). In step S1104, when the instruction set as the ith argument is an INC instruction, for example, the blockchain main process 112 performs the processing of steps S1002 to S1004.

Then, the blockchain main process 112 determines whether or not a result of the execution of the instruction set as the ith argument is a success (step S1105). When the result of the execution of the instruction set as the ith argument is a success (step S1105: Yes), the blockchain main process 112 increments the value of the variable i by one (step S1106), and determines whether or not i is larger than n (step S1107). When i is equal to or smaller than n (step S1107: No), the blockchain main process 112 proceeds to the processing of step S1104.

When i is larger than n (step S1107: Yes), on the other hand, the instructions set as the arguments have all succeeded. Thus, the blockchain main process 112 transmits, as RESPONSE, an identifier indicating that the instructions set as the arguments have all succeeded to a transmission source of SUBTRAN{ } (step S1108).

When the result of the execution of the instruction set as the ith argument is not a success (step S1105: No), on the other hand, the blockchain main process 112 updates the values of the variables updated within the instruction 1, the instruction 2, . . . , and the instruction n to the values before the update using the backed-up values (step S1109). Next, the blockchain main process 112 transmits, as RESPONSE, an identifier indicating that at least one of the instructions set as the arguments has failed to the transmission source of SUBTRAN{ } (step S1110).

After ending the processing of step S1108 or step S1110, the blockchain main process 112 ends the processing at the time of reception of the SUBTRAN instruction.

As described above, when receiving the INC instruction, the blockchain main process 112 executes the above-described one operation on the value of the variable using the above-described difference value, and returns a response to the smart contract app 113. Consequently, because the blockchain main process 112 executes only limited operations, the number of requests may be reduced while security remains maintained. Then, by reducing the number of requests within transactions of the smart contract app 113, the blockchain main process 112 may execute the smart contract app 113 at high speed even when there is a dependence relation, and shorten a total processing time.

In addition, when receiving the SUBTRAN instruction, the blockchain main process 112 may execute each instruction included in the SUBTRAN instruction, and transmit RESPONSE of the SUBTRAN instruction, RESPONSE being based on an operation result of each instruction, to the smart contract app 113. The blockchain main process 112 may therefore reduce to one the number of requests occurring when the SUBTRAN instruction is not used, the number being equal to the number of instructions.

In addition, the blockchain main process 112 may back up the values of the variables to be updated according to each instruction included in the received SUBTRAN instruction, and perform rollback based on the backed-up values when one of the above-described instructions fails. Thus, because the smart contract app 113 does not have to perform rollback, the blockchain main process 112 may reduce requests due to the rollback of the smart contract app 113. Further, because the rollback of the smart contract app 113 does not have to be described, the time and effort of the developer of the smart contract app 113 may be correspondingly reduced.

In addition, because it suffices for a SUBTRAN instruction to include instructions of a plurality of update systems, a SUBTRAN instruction may include two or more PUT_STATE requests, for example. In addition, a SUBTRAN instruction may include one or more INC instructions and one or more PUT_STATE requests.

It is to be noted that the information processing method described in the present embodiment may be implemented by executing a program prepared in advance in a computer such as a personal computer, a workstation, or the like. The program according to the present embodiment is recorded on a computer readable recording medium such as a hard disk, a flexible disk, a compact disc-read only memory (CD-ROM), a digital versatile disk (DVD), or the like, and is executed by being read from the recording medium by a computer. The program according to the present embodiment may also be distributed via a network such as the Internet or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. A non-transitory computer-readable storage medium storing a program that causes a first computer to execute a process, the process comprising:
   receiving, by the first computer which executes a blockchain process and is accessible to a storage device, an update request from a second computer which executes a smart contract application to control the blockchain process and is not accessible to the storage device, the update request including an identifier of data stored in the storage device, an arithmetic operator of a calculation for the data, and an argument value used for the calculation, the calculation being one of four arithmetic calculation and bit calculation, the data being stored in the storage device that denies an access from the second computer;
   storing, as the blockchain process, a value of the data to a different storage area different from a storage area determined based on the identifier;
   executing, as the blockchain process, the calculation for the value of the data based on the arithmetic operator and the argument value, the calculation executed by the first computer being limited to the four arithmetic calculation or the bit calculation; and
   updating, as the blockchain process, the value of the data to an output value of the executed calculation and transmitting response information corresponding to the update request to the second computer.

2. The non-transitory computer-readable storage medium according to claim 1, wherein each of the first computer and the second computer is a virtual machine or a container, the first computer and the second computer working on different physical machine.

3. The non-transitory computer-readable storage medium according to claim 1, wherein the process executed by a computer is a process regarding blockchain system.

4. The non-transitory computer-readable storage medium according to claim 1, wherein the process further comprising:
   receiving a collective update request from the second computer, the collective update request including a plurality of the update request; performing the updating and the transmitting corresponding to the plurality of the update request; and
   transmitting response information that a plurality of responses corresponding to the plurality of the update request that integrates.

5. The non-transitory computer-readable storage medium according to claim 1, wherein the process further comprising:
   receiving a collective update request from the second computer, the collective update request including the update request and a write request, the write request including area information that indicates a specified storage area included in the storage device and a value to be written in the specified storage area;

storing the value included in the write request to a different storage area different from both a storage area of the data and the specified storage area determining whether a result of the calculation indicates success;

writing the value stored in the different storage area to the specified storage area of the data when the result of the calculation does not indicate success; and transmitting, to the second computer, response information indicating that processing corresponding to the collective update request has failed.

6. An information processing device comprising:
a memory; and
a processor coupled to the memory and being accessible to a storage device,
the processor configured to execute a blockchain process comprising:

receiving an update request from a computer which executes a smart contract application to control the blockchain process and is not accessible to the storage device, the update request including an identifier of data stored in the storage device, an arithmetic operator of a calculation for the data, and an argument value used for the calculation, the calculation being one of four arithmetic calculation and bit calculation, the data being stored in the storage device that denies an access from the computer;

storing a value of the data to a different storage area different from a storage area determined based on the identifier;

executing the calculation for the value of the data based on the arithmetic operator and the argument value, the calculation executed by the information processing device being limited to the four arithmetic calculation or the bit calculation; and updating the value of the data to an output value of the executed calculation and transmitting response information corresponding to the update request to the computer.

7. An information processing method executed by a first computer, the information processing method comprising:

receiving, by the first computer which executes a blockchain process and is accessible to a storage device, an update request from a second computer which executes a smart contract application to control the blockchain process and is not accessible to the storage device, the update request including an identifier of data stored in the storage device, an arithmetic operator of a calculation for the data, and an argument value used for the calculation, the calculation being one of four arithmetic calculation and bit calculation, the data being stored in the storage device that denies an access from the second computer;

storing, as the blockchain process, a value of the data to a different storage area different from a storage area determined based on the identifier;

executing, as the blockchain process, the calculation for the value of the data based on the arithmetic operator and the argument value, the calculation executed by the first computer being limited to the four arithmetic calculation or the bit calculation; and updating, as the blockchain process, the value of the data to an output value of the executed calculation and transmitting response information corresponding to the update request to the second computer.

8. The non-transitory computer-readable storage medium according to claim 1, wherein the process further includes:
determining whether a result of the calculation indicates success; and
writing, when the result of the calculation does not indicate success, the value stored in the different storage area to the storage area of the data and transmitting response information indicating that the calculation has failed to the second computer.

9. The information processing device according to claim 6, wherein the process further includes:
determining whether a result of the calculation indicates success; and
writing, when the result of the calculation does not indicate success, the value stored in the different storage area to the storage area of the data and transmitting response information indicating that the calculation has failed to the second computer.

10. The information processing method according to claim 7, further comprising: determining whether a result of the calculation indicates success; and
writing, when the result of the calculation does not indicate success, the value stored in the different storage area to the storage area of the data and transmitting response information indicating that the calculation has failed to the second computer.

* * * * *